(12) United States Patent
Kayama

(10) Patent No.: US 11,834,175 B2
(45) Date of Patent: Dec. 5, 2023

(54) AERIAL REFUELING AIRCRAFT

(71) Applicant: PEARI Co., Ltd., Kanagawa (JP)

(72) Inventor: Tsuneo Kayama, Kanagawa (JP)

(73) Assignee: PEARI CO., LTD., Kanagawa (JP)

( * ) Notice: Subject to any disclaimer, the term of this patent is extended or adjusted under 35 U.S.C. 154(b) by 0 days.

(21) Appl. No.: 17/723,663

(22) Filed: Apr. 19, 2022

(65) Prior Publication Data

US 2023/0242252 A1 Aug. 3, 2023

(30) Foreign Application Priority Data

Jan. 31, 2022 (JP) .................................. 2022-13798

(51) Int. Cl.
  *B64C 39/04* (2006.01)
  *B64C 39/02* (2023.01)

(52) U.S. Cl.
  CPC .............. *B64C 39/04* (2013.01); *B64C 39/02* (2013.01)

(58) Field of Classification Search
  CPC .................................. B64C 39/04; B64C 39/02
  See application file for complete search history.

(56) References Cited

U.S. PATENT DOCUMENTS

| | | | | |
|---|---|---|---|---|
| 1,259,083 A | * | 3/1918 | Covino | B64C 39/04 244/13 |
| 3,159,361 A | * | 12/1964 | Weiland | B60V 1/14 180/117 |
| D211,612 S | * | 7/1968 | De Asis | D12/335 |
| 4,165,058 A | * | 8/1979 | Whitener | B64C 39/08 244/45 R |
| 4,449,679 A | * | 5/1984 | McComas | B64D 7/00 89/37.16 |
| 5,996,939 A | * | 12/1999 | Higgs | B64D 39/00 244/135 R |
| 6,969,026 B2 | * | 11/2005 | Kayama | B64C 39/08 244/45 R |
| 7,152,828 B1 | * | 12/2006 | Garcia, Jr. | B64D 39/04 244/135 A |
| 7,419,120 B2 | * | 9/2008 | Armand | B64C 37/02 244/36 |
| 8,857,755 B2 | * | 10/2014 | Karim | B64C 29/0033 244/12.4 |

(Continued)

FOREIGN PATENT DOCUMENTS

EP 4134301 A1 * 2/2023
WO 97/43180 11/1997

*Primary Examiner* — Assres H Woldemaryam
(74) *Attorney, Agent, or Firm* — Jeffrey S. Melcher; Melcher Patent Law PLLC

(57) ABSTRACT

The main fuselage 12 and the pair of left and right auxiliary fuselage 14, 16 are connected by three wings, the front wing 30, the main wing 26, and the horizontal stabilizer 32. At the connecting portion between the main fuselage 12 and the main wing 26, a narrow portion 28 is provided in the chord of the main wing 26 that is narrower than the other portions of the main wing 26. The narrow portion 28 of the main wing 26 is connected to the side surface of the main fuselage 12 or the narrow portion 28 penetrates the main fuselage 12. The main wing 26 and the pair of left and right auxiliary fuselage 14 and 16 were connected by interposing a flat columnar support 48. The aircraft can fly stably with less turbulence of airflow and is suitable for aerial refueling and the like.

2 Claims, 4 Drawing Sheets

(56) References Cited

U.S. PATENT DOCUMENTS

| | | | |
|---|---|---|---|
| 9,884,682 B2* | 2/2018 | Stuckl | B64C 3/32 |
| 9,933,521 B2 | 3/2018 | Riley | |
| 10,081,436 B1* | 9/2018 | Tian | B64D 31/00 |
| 11,518,505 B1* | 12/2022 | Bruell | B64C 29/0033 |
| 2004/0195433 A1* | 10/2004 | Kayama | B64C 29/0025 |
| | | | 244/10 |
| 2012/0049004 A1* | 3/2012 | Cutler | B64D 39/06 |
| | | | 244/135 A |
| 2018/0079484 A1* | 3/2018 | Ross | B64C 7/02 |
| 2019/0185141 A1* | 6/2019 | Paulson | B64C 11/28 |
| 2020/0140079 A1* | 5/2020 | Campbell | B64C 27/28 |

* cited by examiner

AERIAL REFUELING AIRCRAFT

TECHNICAL FIELD OF THE INVENTION

The present invention relates to an aircraft having an airframe in which a main fuselage and auxiliary fuselages are connected by a main wing, a front wing, and a horizontal stabilizer.

BACKGROUND OF THE INVENTION

The prototype of the aircraft of the present invention is described in U.S. Pat. No. 6,969,026 (Patent Document 1). This aircraft has the feature of being able to fly stably even at low speeds.

PRIOR ART

Patent Document 1: U.S. Pat. No. 6,969,026
Patent Document 2: U.S. Pat. No. 9,933,521
Patent Document 3: WO1097/43180

SUMMARY OF INVENTION

Problem to be Solved by the Invention

An example of the use of the aircraft of the present invention is an aerial refueling aircraft. Traditionally, aerial refueling has been used to save fuel consumed during takeoff or to save round-trip fuel required when returning to the base for refueling. U.S. Pat. No. 9,933,521 (Patent Document 2) introduces an aircraft that can simultaneously refuel multiple aircraft in the air.

For aerial refueling, a flexible refueling pipe or rod-shaped boom is used (WO1097/43180 (Patent Document 3). Advanced maneuvering technology is required to connect the boom while following an aircraft flying ahead in the air.

In this way, when a plurality of aircraft fly close to each other, safe and stable flight performance is required. For stable flight of aircraft flying immediately behind, aerial refueling aircraft are required to have a structure that does not disturb the air flow. An object of the present invention is to solve these problems.

Means for Solving the Problem

The following configurations are means for solving the above-mentioned problems, respectively.

Configuration 1

An aircraft having a main fuselage 12, and a pair of left and right auxiliary fuselage 14, 16, that the fuselages are connected by the front wing 30, the main wing 26, and the horizontal stabilizer 32 wherein;
  the chords of the front wing 30, the main wing 26, and the horizontal stabilizer 32 are all almost constant over the entire length;
  a narrow portion 28 in which the chord of the main wing 26 is narrower than the other parts is provided at the connection portion between the main fuselage 12 and the main wing 26; and
  the narrow portion 28 of the main wing 26 is connected to the side surface of the main fuselage 12 or penetrates the main fuselage 12.

Configuration 2

The aircraft according to the configuration 1, the main wing 26, the pair of left and right auxiliary fuselage 14, 16 are connected by interposing a flat columnar support 48 facing in the same direction as the vertical stabilizer 34.

Configuration 3

The aircraft according to the configuration 2, cross section of the auxiliary fuselage 14 and 16 is a perfect circular.

Configuration 4

The aircraft according to the configuration 3, the aircraft have booms 56 and 58 made of rigid pipes for aerial refueling along the outer wall surface of the auxiliary fuselage.

Configuration 5

The aircraft according to the configuration 1, the aircraft have a main fuselage and two pairs of left and right auxiliary fuselage 18, 20.

Effect of Configurations (1) Comparing the chords of the front wing 30, the main wing 26, and the horizontal stabilizer 32, the chord of the main wing 26 is the widest. As the narrow portion 28 is provided at the connecting portion between the main wing 26 and the main fuselage 12, the turbulence of the airflow in this portion is reduced. Since the main fuselage 12 and the pair of left and right auxiliary fuselage are connected by three wings, there is no risk of a decrease in strength.

(2) When the main wing 26 and the pair of left and right auxiliary fuselage 14 and 16 relate to the flat columnar support 48 interposed therebetween, the turbulence of the airflow in this portion is reduced.

(3) When the cross sections of the auxiliary fuselages 14 and 16 are made perfectly circular, pressurized hydrogen fuel and the like can be loaded.

(4) Since a large amount of fuel can be loaded on the auxiliary fuselage 14 and 16, the booms 56 and 58 made of rigid pipes can be used to supply fuel to other aircraft.

(5) Since there is little turbulence in the airflow and stable flight is possible, fuel can be safely supplied to other aircraft.

PREFERRED EMBODIMENTS

Hereinafter, embodiments of the present invention will be described in detail for each example.

Embodiment 1

Figure 1A:
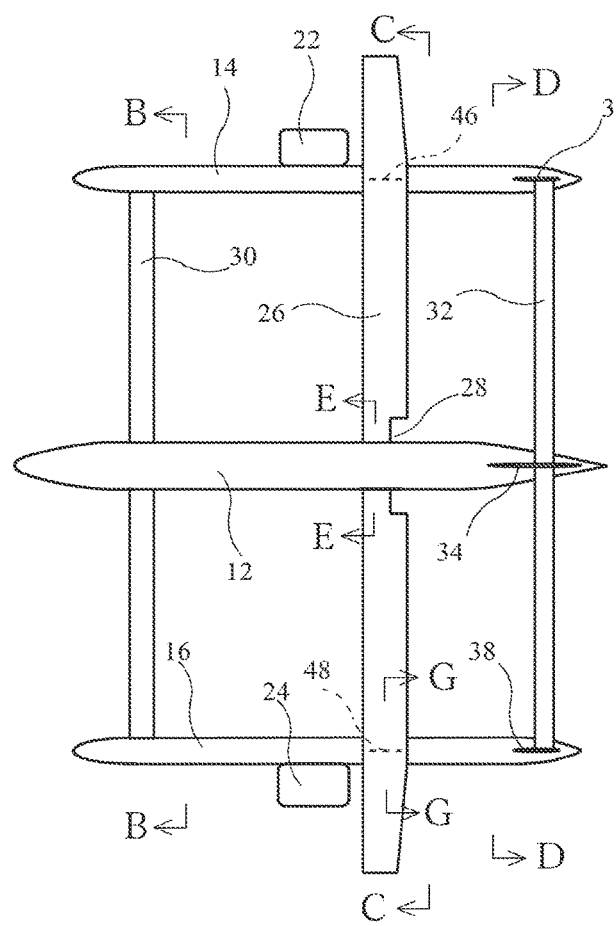
FIG. 1A is a plan view of the aircraft of the present invention.

As shown in FIG. 1A, this aircraft has a main fuselage 12 and a pair of left and right auxiliary fuselage 14, 16. The fuselages are connected by three wings. They are a front wing 30, a main wing 26, and a horizontal stabilizer 32. The main fuselage 12 is provided with a driver's seat and a cabin, but the drawings are omitted. As shown in FIG. 1B to 1G, the auxiliary fuselage 14 and 16 are, for example, cylindrical tanks loaded with aircraft fuel. In this embodiment, the auxiliary fuselage 14 and the auxiliary fuselage 16 are used for aerial refueling.

Figure 1B:
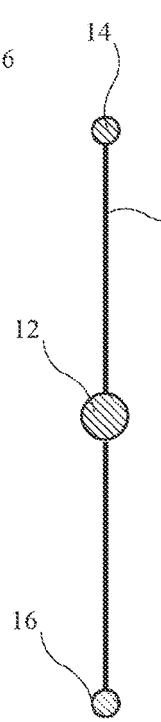
FIG. 1B is a sectional view thereof B-B.
Figures 1C, 1D:
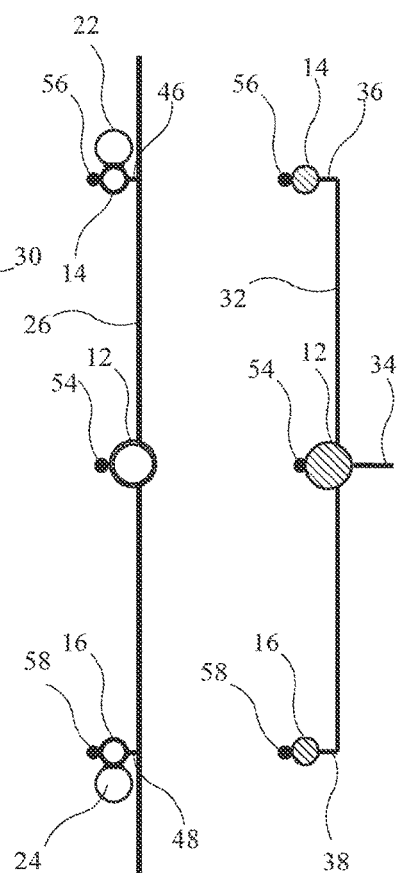
FIG. 1C is a sectional view thereof C-C.
FIG. 1D is a sectional view thereof D-D.

As shown in FIG. 1B to 1D, the auxiliary fuselage 14 and the auxiliary fuselage 16 loaded with fuel. They are located at positions separated from the main body 12 to the left and right. The safety is high. Moreover, this aircraft has a simple structure and is robust. In this embodiment, as shown in FIG. 1C, booms 56, 58 for aerial refueling are supported along the bottom walls of the auxiliary fuselage 14, 16. A boom 54 for aerial refueling is also supported along the bottom wall of the main fuselage 12.

The main engines 22 and 24 are fixed to the outer surfaces of the auxiliary fuselage 14 and the auxiliary fuselage 16, respectively. The main engine 22 is supplied with fuel from the auxiliary fuselage 14. The main engine 24 is supplied with fuel from the auxiliary fuselage 16.

Connection Between Main Wing and Main Fuselage

The rigidity of the airframe is enhanced by the structure that combines the three wings 26, 30, and 32. Since the three wings of the front wing 30, the main wing 26, and the horizontal stabilizer 32 share the support of the airframe. The burden on the main wing 26 for supporting the weight of the airframe is small.

Conventionally, in a general aircraft, almost the entire weight of the airframe is supported only by the main wing. Therefore, the connecting part between the fuselage and the main wing has a thick wing thickness and a wider chord structure than the other parts so as to maintain sufficient strength.

On the other hand, in the airplane of the present invention, the chords of the front wing 30, the main wing 26, and the horizontal stabilizer 32 are all substantially constant over the entire length. Further, since the load shared by the main wing 26 is small, the wing thickness can be reduced and, as an exception, the chord can be made narrower than the other parts at the connecting portion between the main fuselage 12 and the main wing 26.

Figure 1E:
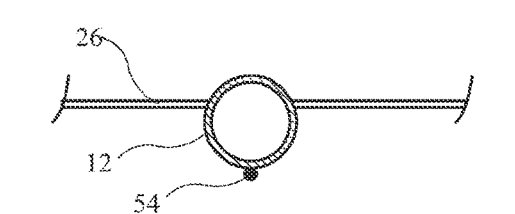
FIG. 1E is a sectional view thereof E-E.

In the example of FIG. 1E, the end of the narrow portion 28 of the main wing 26 is connected to the side surface of the main fuselage 12. In the modified example of FIG. 1F, the narrow portion 28 of the main wing 26 penetrates the main fuselage 12. The structure of the FIG. 1F example has higher strength than that of the FIG. 1E example.

Figure 1F:
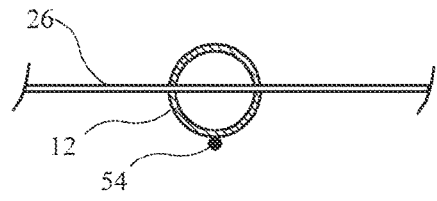
FIG. 1F is a cross-sectional view taken along the line E-E of the modified example.
Figure 1G:
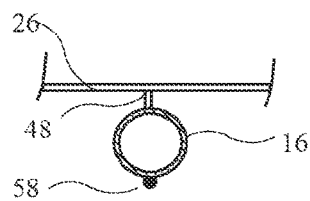
FIG. 1G is a cross-sectional view taken along the line G-G.

FIG. 1G shows a connection structure between the main wing 26 and the auxiliary fuselage 14 and the auxiliary fuselage 16. A structure is adopted in which a flat columnar support 48 is sandwiched between the main wing 26 and the auxiliary fuselage 14 or 16. That is, the main wing 26 and the auxiliary fuselage 14 and 16 were not directly connected, but were connected by interposing the support 48 to prevent the turbulence of the air flow.

Since the connection between the auxiliary fuselage 14 and 16 and the front wing 30 and the horizontal stabilizer 32 has a small shared load and these chords are narrow, any structure of FIG. 1E to FIG. 1G may be adopted.

With the above structure, mutual interference of airflow during flight at the connected portion of the main fuselage and the main wing is reduced, air resistance is reduced, and stable flight is possible. Moreover, the weight of the aircraft can be reduced.

Fuel Loading

As shown in FIG. 1G, the cross sections of the auxiliary fuselage 14 and 16 are perfect circular. So, the strength of them is increased. Liquefied gas (LNG) or hydrogen can be filled by applying high pressure and used as aviation fuel. If liquefied gas or hydrogen is used as aviation fuel, $CO_2$ emissions can be reduced. If a pressurized fuel tank is to be installed inside the main fuselage 12 or the main wing, the structure becomes complicated. This problem can be solved by using the auxiliary fuselage 14 and 16 for the fuel tank.

Embodiment 2

Aerial Refueling

Figure 2:
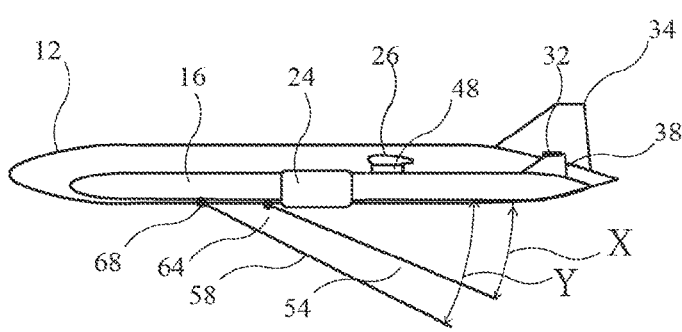
FIG. 2 is a side view of the aircraft of the present invention.

As shown in FIG. 1B to FIG. 2 and FIG. 2, if the booms 56 and 58 made of rigid pipes are attached to the auxiliary fuselage bodies 14 and 16, this aircraft can be used as an aerial refueling device. The auxiliary fuselage bodies 14 and 16 have a long cylindrical outer wall surface with few irregularities.

If the booms 56 and 58 are aligned with the cylindrical outer wall surface of these auxiliary fuselage bodies, a long boom for refueling can be supported. If the booms 56 and 58 made of rigid pipes are used, the connection is easier and the refueling can be performed with higher safety than the flexible hose.

Moreover, since the wing structure described above has less turbulence in the airflow, stable flight is possible even when a plurality of airplanes fly close to each other.

Figure 3:
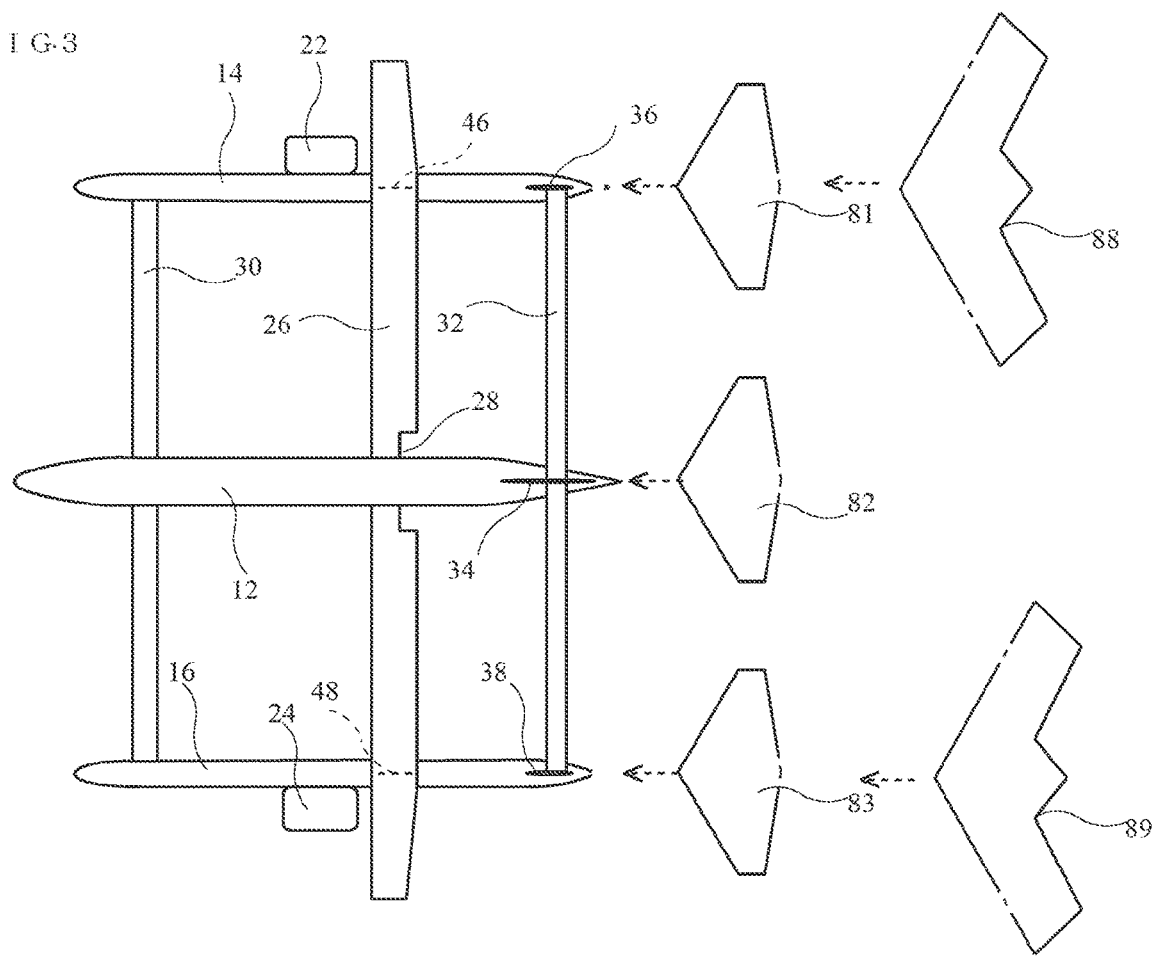
FIG. 3 is a plan view of an aircraft refueling three aircraft.

The main fuselage 12 and the pair of auxiliary fuselages 14, 16 are used for an aerial refueling device using booms 54, 56, 58 made of rigid pipes. As shown in FIG. 3, three aircraft can be safely aerial refueled at the same time.

If it is a large aircraft as shown by the alternate long and short dash line of FIG. 3, the two aircrafts can be refueled at the same time by the left and right auxiliary fuselage 14 and 16. This makes it possible to safely supply a large amount of fuel.

Figure 4:
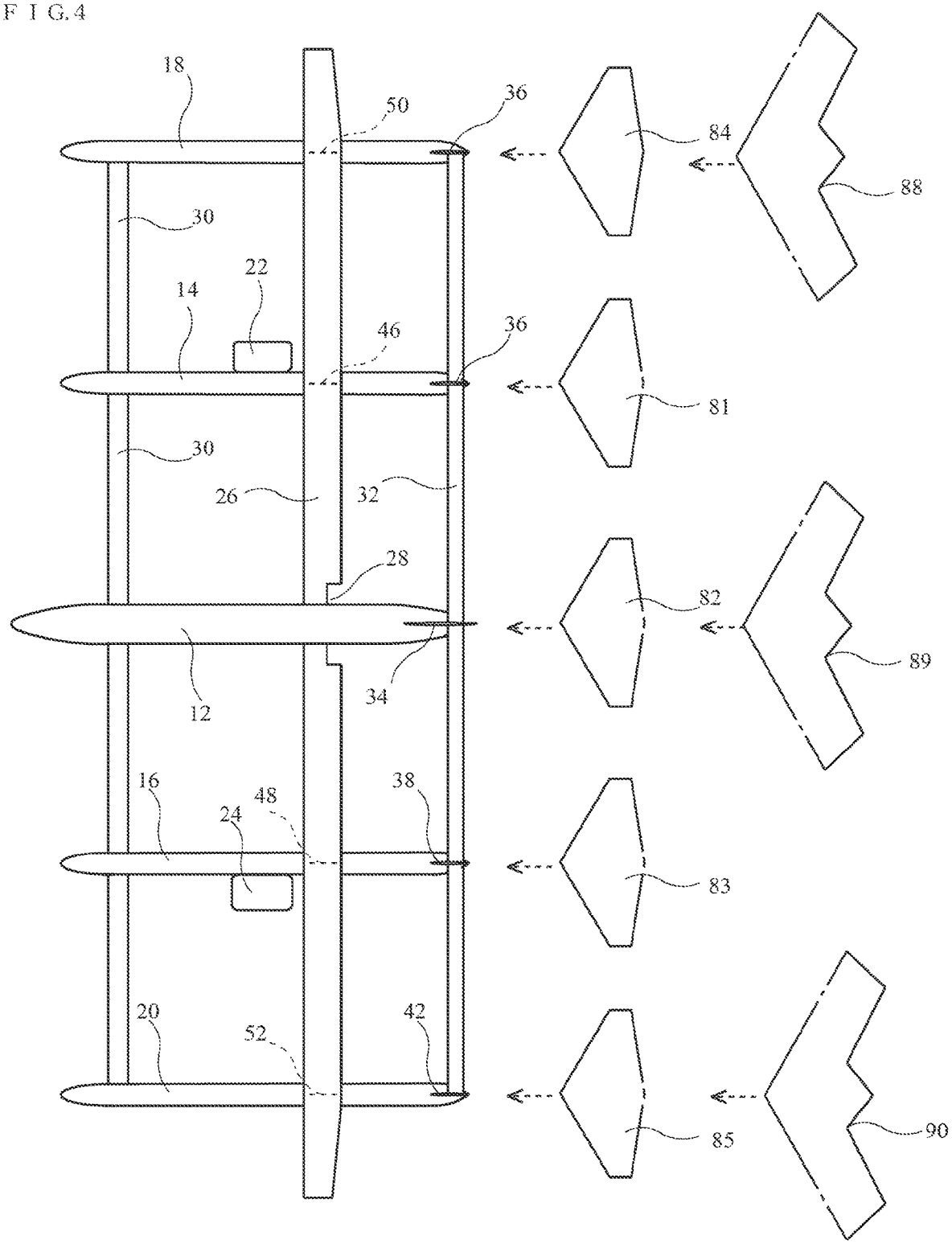
FIG. 4 is a plan view of an aircraft refueling five aircraft.

In this airplane, the main wing 26, the front wing 30, and the horizontal stabilizer 32 have a linear shape and are mounted in parallel with each other. Therefore, as shown in FIG. 4, these wings can be extended to the left and right to further provide a pair of auxiliary fuselage bodies 18 and auxiliary fuselage bodies 20.

It is possible to make an aircraft having a main fuselage and two pairs of left and right auxiliary fuselage. In this way, when flying alone, the cruising range can be greatly extended. In addition, when using for an aerial refueling aircraft, it is possible to refuel for five small aircrafts and for three large aircrafts at the same time.

Embodiment 3

STOL Aircraft

Figure 5:
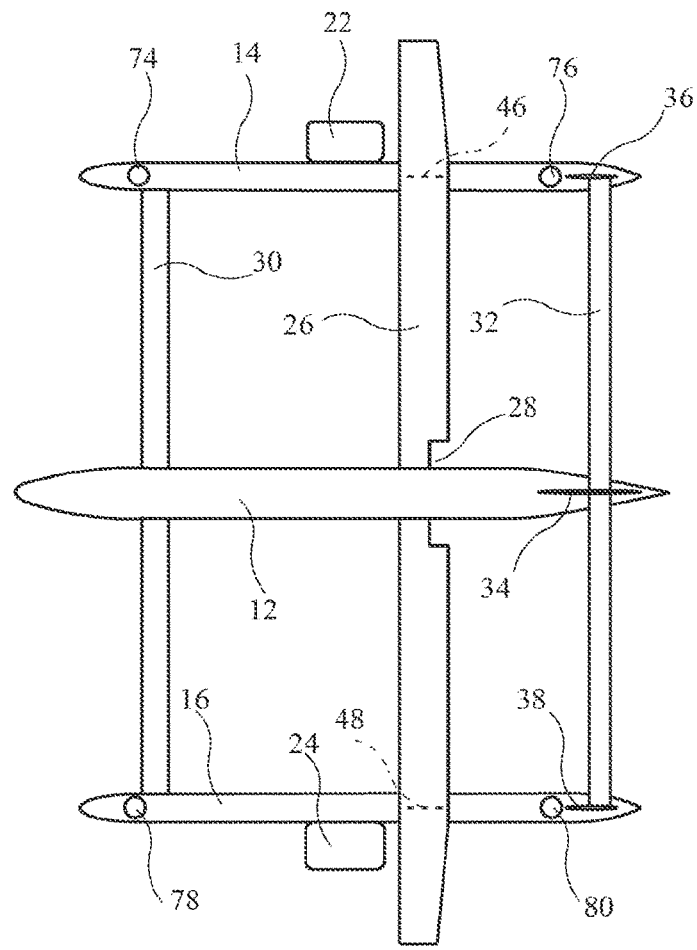
FIG. 5 is a plan view of an embodiment in which the aircraft of the present invention is a VTOL aircraft.

As shown in FIG. 5, engines 22 and 24 can be attached to the auxiliary fuselage bodies 14 and 16. By attaching one lift engine 74, 76, 78, 80 to the front and rear parts of the auxiliary fuselage 14 and 16, respectively, low-speed flight is possible and a STOL aircraft (short-range takeoff and landing aircraft) is realized.

Figure 6:
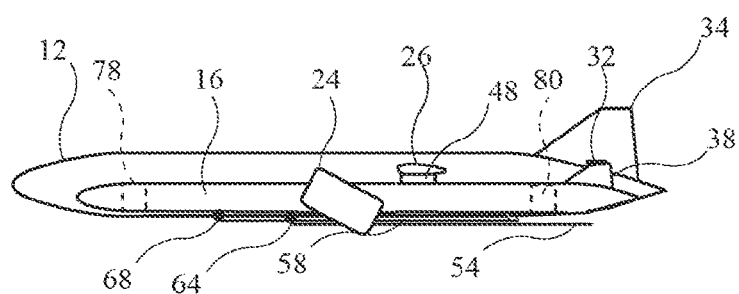
FIG. 6 is a side view of an airplane flying while spraying water.

As shown in FIG. 6, if the exhaust ports of the engines 22 and 24 can be directed backward or diagonally downward, a thrust conversion type engine can be realized. These engines 22 and 24 allow for safe low speed flight and takeoff and landing on short runways.

When conventional aircraft increase in speed, long runways are required for takeoff and landing. In addition, since the approach angle to the airport at the time of landing is as low as several degrees, noise damage to the neighborhood of the airport is serious. The aircraft of the present invention has high performance if it is an STOL aircraft, and solves this problem.

Flight with Hydrogen Fuel

For example, if hydrogen-fueled engines 22 and 24 are provided, a mechanism for mixing silver iodide in the exhaust gas can be provided to stimulate clouds and make it rain. By stimulating typhoon clouds and cumulonimbus clouds on the sea to make it rain on the sea, it is possible to reduce the amount of rainfall on land.

DESCRIPTION OF THE REFERENCE NUMBER 12 main fuselage
14 auxiliary fuselage
16 auxiliary fuselage
18 auxiliary fuselage
20 auxiliary fuselage
22 main engine
24 main engine
26 main wing
28 narrow part
30 front wing (Canard)
32 horizontal stabilizer
34-42 vertical stabilizer
44-52 support
54-62 refueling pipe
64-68 universal joints
74-80 lift engine
81-85 small aircraft
88-90 large aircraft

The invention claimed is:

1. An aircraft having a main fuselage, and two a pairs of left and right auxiliary fuselages, that the two pairs of left and right auxiliary fuselages are connected by a front wing, a main wing, and a horizontal stabilizer wherein;
   a chord of the front wing, a chord of the main wing, and a chord of the horizontal stabilizer are all almost constant over the entire length;
   a narrow portion of the chord of the main wing is provided at a connection portion between the main fuselage and the main wing;
   a cross section of each of the two pairs of left and right auxiliary fuselages is a perfect circular; and
   booms made of rigid pipes for aerial refueling along the outer wall surface of the two pairs of left and right auxiliary fuselages.

2. The aircraft according to the claim 1, wherein the main wing and the two pairs of left and right auxiliary fuselages are connected by interposing a flat columnar support facing in a same direction as a vertical stabilizer.

* * * * *